Figure 1:
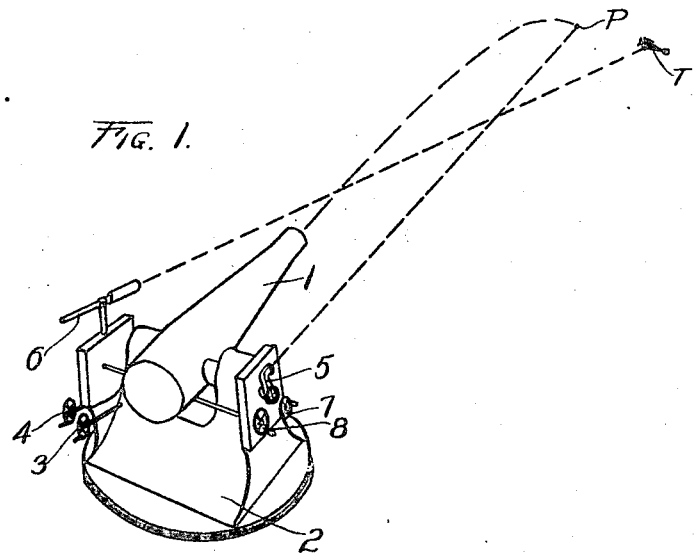

Feb. 13, 1923.

R. V. MORSE.
LEAD CONTROL SYSTEM FOR ANTIAIRCRAFT ARTILLERY.
FILED OCT. 2, 1918.

1,445,028.

4 SHEETS—SHEET 1.

Robert V. Morse
INVENTOR

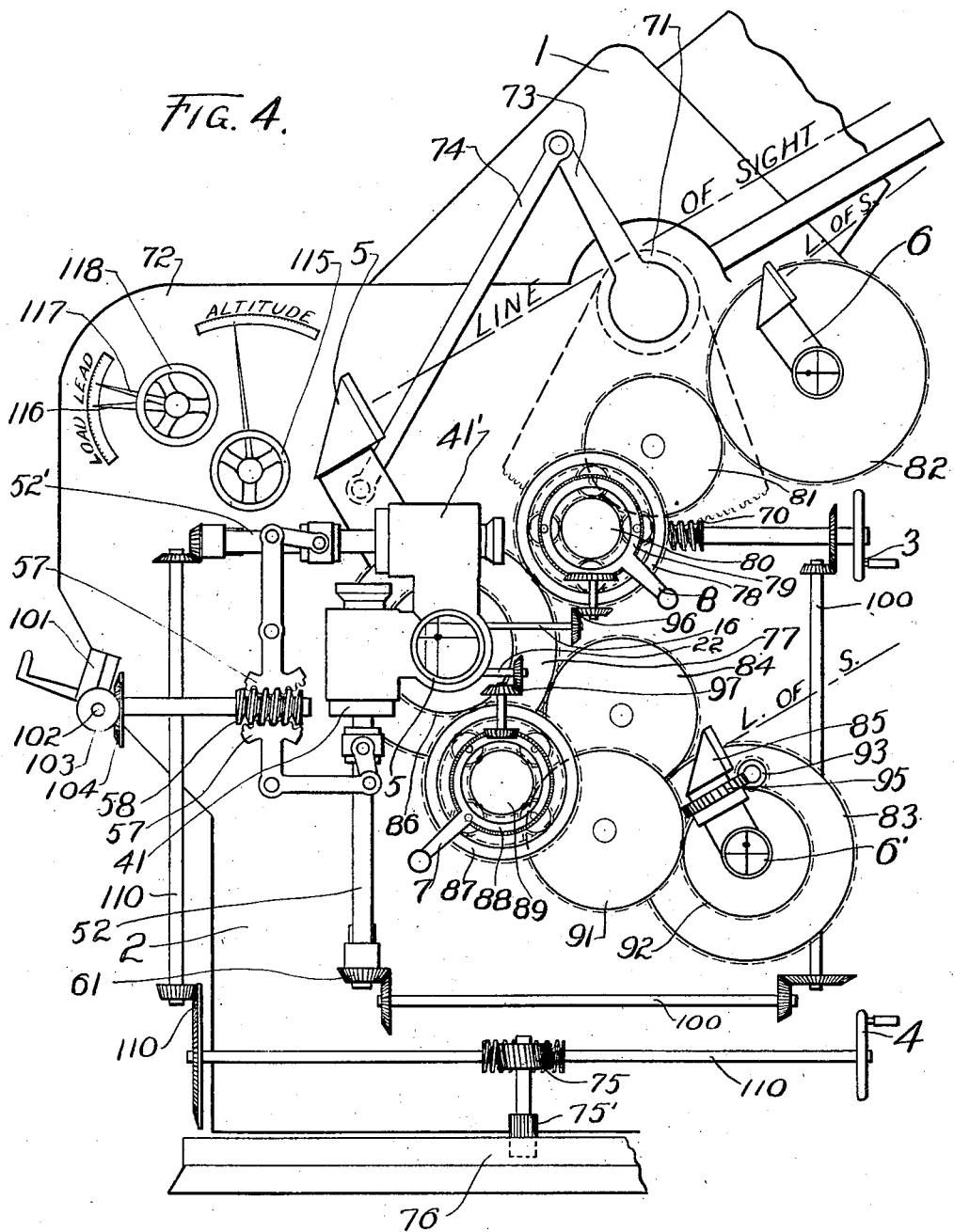

Feb. 13, 1923.
R. V. MORSE.
LEAD CONTROL SYSTEM FOR ANTIAIRCRAFT ARTILLERY.
FILED OCT. 2, 1918.
1,445,028.
4 SHEETS—SHEET 4.
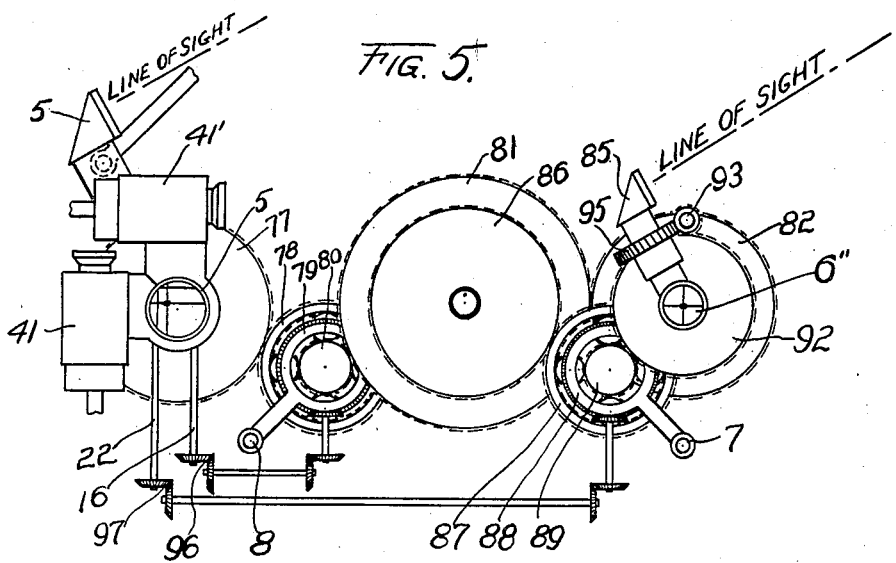
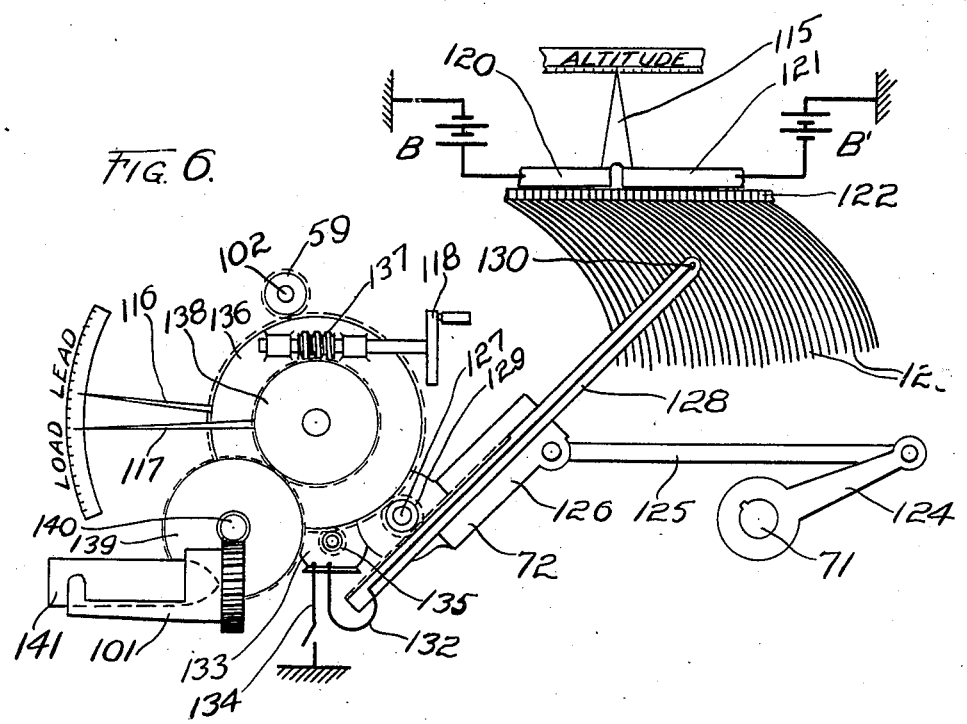
INVENTOR
Robert V. Morse Patented Feb. 13, 1923.

1,445,028

UNITED STATES PATENT OFFICE.

ROBERT V. MORSE, OF ITHACA, NEW YORK, ASSIGNOR TO MORSE INSTRUMENT COMPANY, INC., OF ITHACA, NEW YORK, A CORPORATION OF NEW YORK.

LEAD CONTROL SYSTEM FOR ANTIAIRCRAFT ARTILLERY.

Application filed October 2, 1918. Serial No. 256,514.

*To all whom it may concern:*

Be it known that I, ROBERT V. MORSE, a citizen of the United States, residing at Ithaca, in the county of Tompkins and State of New York, have invented a new and useful Lead Control System for Antiaircraft Artillery, of which the following, taken with the accompanying drawings, is a specification.

This invention relates in general to artillery stationed on the ground and employed against airplanes and other aircraft, and is concerned in particular with the apparatus for maintaining the lead of the point of aim a proper distance ahead to compensate for the rapid movement of the target.

In my copending applications Ser. No. 191,266, Fuze setter controller for antiaircraft guns, filed Sept. 13, 1917; Ser. No. 191,265, Electric fuze setter controller for antiaircraft guns, filed Sept. 13, 1917; Ser. No. 191,269, Electric sight controlling mechanism for antiaircraft guns, filed Sept. 13, 1917; and elsewhere; there is described mechanism by which the sight setting and fuze setting, on an altitude basis, are kept continuously correct for the point of aim of the gun. It will be obvious that the point of aim cannot be directly at the target, since aircraft often travels at speeds in the neighborhood of 150 ft. per second, and several seconds will elapse before the projectile has traveled from the gun to the point of aim. The point of aim must be sufficiently far ahead of the target so that the aircraft and projectile will arrive at that point simultaneously. When the sight and fuze are not automatically set, this lead which must be given the point of aim covers the period of time consumed in setting the fuze and loading, as well as the time of flight of the projectile. Yet even with the automatic apparatus mentioned above, which reduces to zero the lead covering setting and loading, there still remains the lead covering the time of flight of the projectile. Of course this latter lead, being for a much shorter time, can be determined with greater accuracy, but in any case it is not easy to make a precise estimate. The objects of this invention are to permit a comparatively precise continuous determination of the lead of the point of aim ahead of the actual position of the target; and, when desired, to automatically compute and indicate continuously to the gunner the proper value for the lead. Various other objects will appear as the description proceeds.

Figure 2:
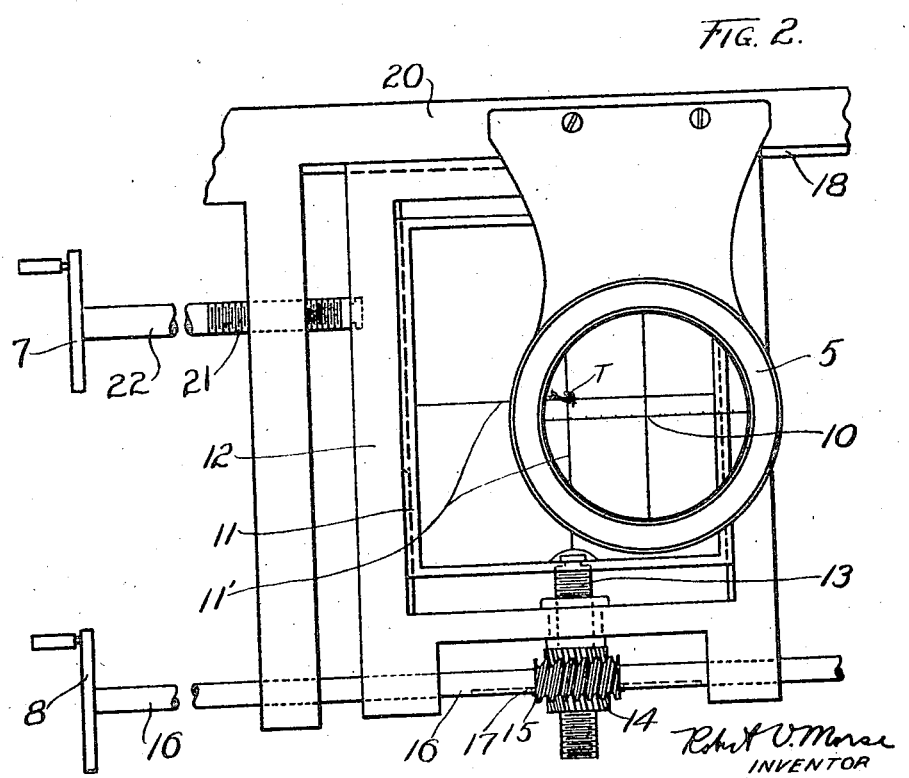
Figure 3:
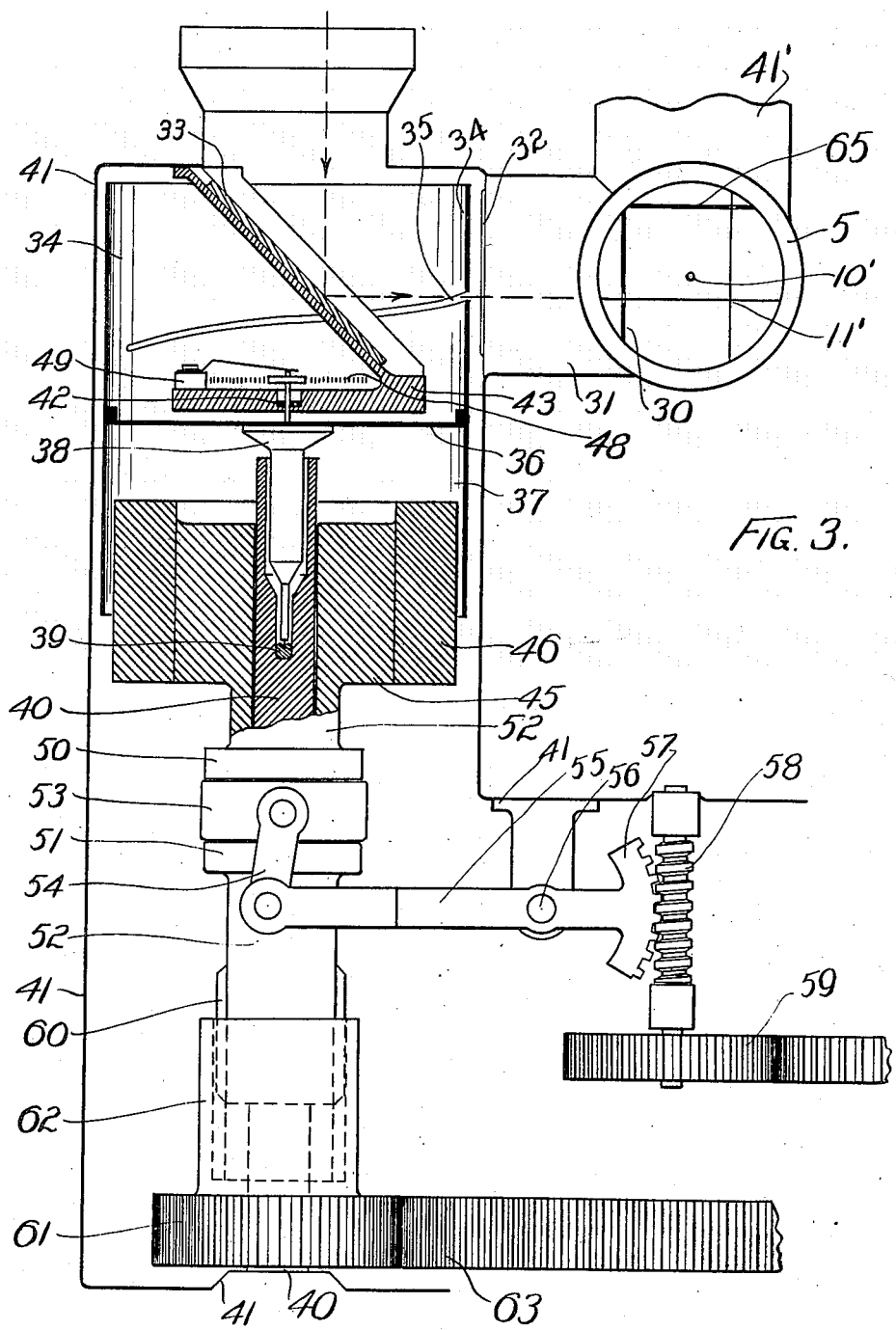

In the drawings forming part of this specification, Fig. 1 is a perspective view showing in a diagrammatic way the general principles of the sighting system; Fig. 2 is an elevation illustrating a means for obtaining the fixed and movable points of aim viewed thru the primary or lead controlling sight; Fig. 3 is an elevation, partly in section, of an automatic mechanism for continuously computing and indicating at the primary sight the correct value for the lead; Fig. 4 is an elevation,—somewhat diagrammatic, in order that the principles may be clearly shown in a single view,— of a more elaborate mechanism having the same general principles as Fig. 1, with minor variations, but with the automatic lead computing mechanisms of Fig. 3 added.

Fig. 5 shows a modified form of connection between the primary and secondary sights, and Fig. 6 shows one form of automatic mechanism for determining the time of flight and fuse setting.

Referring to Fig. 1, the gun 1 carried on the rotatable mount 2 is elevated and rotated by the controls 3 and 4, which operate in the usual manner, one control wheel such as 3 swinging the gun vertically on its trunnions, the other control wheel 4 rotating the gun and mount horizontally. The primary or gun sight 5 indicates the actual point of aim of the gun, its angle of sight elevation, which compensates for the curvature of the trajectory, being kept continuously correct by any suitable sight controlling device,—such for example as is at present used in the Army, or the type described in my copending applications referred to above, or as shown in Patent No. 1,306,611, granted to Robert V. Morse, on June 10, 1919. Though this primary sight 5 shows the actual point of aim of the gun 1, the mechanism of this gun control differs from ordinary artillery in that the gun pointer controlling the gun thru the operation of the wheels 3 and 4 does not look thru the gun sight 5. Instead the gun pointer trains on the target thru a secondary sight 6, which is connected mechanically with the same mechanism that controls the sight 5, so that the line of sight of the secondary sight 6, if not interfered with, would normally remain parallel to and vary with the line of sight of the primary sight 5. Without preventing the simultaneous operation of the sight 6 by the same mechanism that controls the sight 5, a means is provided for introducing any desired angular variation between the line of sight of the sight 6 and that of the sight 5. By the operation of the control wheels 7 and 8, the secondary sight 6 can be set at any desired angle with the primary sight 5, after which the sight 6 will continue to swing at the same rate as the sight 5, but with the set angular difference between them. The gun pointer operating the gun-controls 3 and 4 looks thru the sight 6,—this secondary sight being provided with the usual cross-hairs,— and operates his controls to keep the cross-hairs directly on the target T. The man at the primary sight 5, by operating his control wheels 7 and 8, can put the secondary line of sight out of line to any desired extent. Thus when the gun pointer thinks he is aiming directly at the target T as in Fig. 1, he may be actually aiming at a point P, which is indicated by the primary sight 5. The man at the controls 7 and 8 thus controls the lead, or the distance of the point of aim P from the target T; and this function is distinctly separated out from that of the gun pointer, who is solely concerned with following the motion of the target. By thus separating the two functions, it becomes possible to perform each accurately. The general mechanism employed may be summed up as a gun controlled thru a secondary or floating line of sight, whose angular relation to the primary or actual line of aim may be continuously observed and definitely varied at will.

The primary sight 5 of the gun differs from the ordinary sight in that it has two sets of indicators or cross-hairs. Referring now to Fig. 2, which shows the field of view of the primary sight 5, and associated apparatus,—the sight 5 is provided with the usual central fixed cross-hairs 10, which indicate the actual point of aim as in the ordinary telescopic sight. These cross-hairs may be calibrated by small cross marks indicating degrees or other angular units. A second pair of cross-hairs 11' is carried in the movable frame 11, which can be moved vertically and horizontally so as to place the intersection of the movable cross-hairs at any place in the field of view. In Fig. 2 the airplane target T is shown at the intersection of the movable cross-hairs. The frame 11 carrying the movable cross-hairs 11' is arranged to be moved to correspond to the horizontal and vertical angularity between the primary sight 5 and secondary sight 6. One means of accomplishing this is shown in Fig. 2, in which the frame 11 is arranged to slide vertically in the frame 12, being elevated and lowered by the screw 13, operated on by the nut 14, which is externally cut as a worm wheel and turned by the worm 15. The worm 15 is driven from the shaft 16 by a spline and groove 17, arranged so that the worm 15 may slide freely longitudinally of the shaft 16. Also sliding freely on the shaft 16 is the frame 12, which is mentioned above as carrying the frame 11. This frame 12 is also grooved at the top and slides horizontally on the tongue 18 on the main or fixed frame 20, being operated horizontally by means of the screw 21 in the main frame 20. The shaft 22 operating the screw 21 is connected to the hand wheel 7, and the shaft 16, which elevates and lowers the movable cross-hairs, is connected to the hand wheel 8. As has been described, the operation of the hand wheels 7 and 8 causes any desired horizontal and vertical angularity between the primary sight 5 and the secondary sight 6 of Fig. 1. The gearing controlling the movable cross-hairs in Fig. 2 is proportioned so that the movable cross-hairs 11' are displaced the same number of vertical and horizontal degrees in the field of view of the sight 5 as the line of sight of the secondary sight 6 is displaced from the line of sight of the sight 5. The observer at the sight 5 sees, by the relation of his movable cross-hairs to his central cross-hairs, the precise amount and direction of the angularity between his sight and the secondary sight,—in other words, the operator at the sight 5 sees the actual angular lead which he has given the secondary sight 6. The field of view of the sight 5 must of course be large enough to cover the angular lead which has been given, and though this implies a correspondingly low magnifying power, (magnifying power being inversely proportional to field), the target can still be identified by the higher power secondary sight 6, where a large field is not required. The target can be picked up by the low power sight 5, and then, by operating the controls 7 and 8, it can be brought into the field of view of the higher powered secondary sight 6 for identification.

The operation of the apparatus thus far described is as follows: it will be recalled that the duty of the gun pointer operating the gun controls 3 and 4, (Fig. 1), is to keep the secondary sight 6 trained directly on the target. Since the movable cross-hairs 11' of the primary sight 5 indicate a line of sight parallel to that of the secondary sight 6, it will be obvious that so long as the gun pointer accurately performs his duty the moving target will continue to rest upon the movable cross-hairs 11' of the sight 5, without any operation of the controls at that sight. To the man at the primary sight 5, the target, regardless of its actual speed, appears to remain substantially stationary on his movable cross-hairs. If he alters the location of the movable cross-hairs 11' by operating his controls 7 and 8, the target apparently alters its location accordingly, and follows the movable cross-hairs around wherever they may be set, resting on their intersection. It is the duty of the man at the primary sight 5 to keep setting the movable cross-hairs 11', (by operating his controls 7 and 8), so that the target is always headed toward the center of his sight, and located at a distance from the center corresponding to the travel of the target during the time interval of the lead. If the time interval of the lead is the same as the time of flight of the projectile for example, the operator at the sight 5 is kept continually apprised of this time by the fuze setter; he is also informed of the angular velocity of the target, by any suitable means, such as speedometers geared to the gun controls 3 and 4. The angular lead is here equal to the product of the angular velocity by the time of flight; for example, if the angular velocity were 2° and the time of flight 5 seconds, the lead is equal to 10°, and the movable cross-hairs can be set accordingly on the calibrated central cross-hairs of the sight 5. The lead to be set may often be estimated by the experienced operator without mathematical computation, but the computation it will be noted, is greatly simplified by the fact that the operator is dealing with a slowly varying quantity, lead, instead of the rapidly varying quantity, position of the target.

If the gun is kept a continuously accurate instrument capable of delivering a burst on the instantaneous point of aim, (by the use of automatic sight and fuze setters, such as have been mentioned), the correctness of the lead setting can often be judged by noting the location of the bursts relative to the target. If they are ahead of the target, the lead should be decreased; and if behind, the lead should be increased. The lead can also be checked at any time by stopping the gun controls at the instant of discharge. If the lead setting is correct, the target, as viewed thru the sight 5, will travel from the movable cross-hairs to the central cross-hairs in the time of flight of the projectile, and the burst will occur on the central cross-hairs at the instant the target reaches them. This check is possible even if a large number of guns are firing, since the burst can be identified by its location on the center of the sight, as well as approximated by counting the time of flight corresponding to the fuze setting. By practicing aiming on friendly aircraft, counting the equivalent time of flight, the operators can develop considerable skill in the estimation of lead and in gun pointing. This important development of skill is possible because responsibility is localized by the separation of functions; the man controlling the lead can actually see whether the gun pointer is performing accurately, and hence knows definitely whether he or the gun pointer is responsible for a miss. No considerable skill can be developed where, as in prior systems, it is impossible to observe the various functions simultaneously, since there is no way of detecting and weeding out the inaccurate man. It will be noted that under the system described, if automatic sight and fuze setters are used, responsibility for the performance of the gun can be placed squarely on the officer operating the controls at the primary sight 5, since he not only controls the lead but has the gun pointer continuously under his observation.

There have been described the general principles of the lead control system by which the lead can be continuously observed as a slowly varying quantity and set according to estimates of the operator based on observation or on information transmitted to him verbally. While in the hands of an experienced operator this may give good results under ordinary conditions, it is desirable, particularly with fire at long ranges to have the lead automaticaly computed and continuously indicated in the field of view of the primary sight 5. This is the function of the apparatus illustrated in detail in Fig. 3.

Referring now to Fig. 3, the field of view of the primary sight 5 is shown provided with the movable cross-hairs 11' as described in connection with Fig. 2. In place of the central fixed cross-hairs 10 of Fig. 2, a dot 10' is placed in the center of the field,—though of course the equivalent cross-hairs could as well be used if desired. In the telescope tube of the sight is placed a small bright vertical wire or narrow strip 30 turned so as to reflect to the eye any lateral light that may fall upon it; but lying in the darkness of the telescope tube and not being illuminated it appears black in the field of vision. Opposite this wire is a lateral extension 31 of the sighting tube, by which light passing thru a narrow vertical slot 32 may fall upon and illuminate a portion of the wire 30. The path of this light is indicated by the broken line and narrow heads, and is briefly from some outside source to the fixed mirror 33, which lies within a rotatable cup 34 in whose sides is an inclined slot 35, thru which the light reflected from the mirror 33 passes out and thru the vertical slot 32 and lateral tube 31 to illuminate a portion of the wire 30 corresponding to the elevation of the slot 35 thru which the light passed. The rotatable cup 34 is shown in section,—the cross-sectioning being indicated by heavy black owing to the thinness of its walls. The cup 34 is really a cylindrical shell having an internal diaphram 36, forming the bottom of the upper cup 34 and the top of a lower inverted cup 37. These upper and lower cups are mounted on the shaft 38, which passes thru and is secured to the diaphram 36. This shaft 38 is carried at its lower end in the pivot 39 arranged in the fixed or stationary shaft 40, which shaft 40 passes down inside the apparatus shown and is rigidly secured to the main frame or casing 41. The upper part of the shaft 38 is small in diameter, and passes upward thru a small jeweled bearing 42 arranged in a horizontal extension of the frame 43 which carries the fixed mirror 33, referred to above. The frame 43 is secured to the main frame or casing 41, which encloses the apparatus. As the upper cup 34 is rotated, the helical arrangement of the slot 35 will cause the bright spot on the wire 30 to be raised or lowered on that wire according to the rotation of the cup. There will now be described the mechanism by which the cup 34 is rotated to correspond to the product of two quantities, that is, in this case, the vertical angular velocity of the target multiplied by the time of flight of the projectile,—in other words, the vertical angular lead.

The upper cup 34 is attached to, or a part of, the lower inverted metallic cup 37. Rotatably mounted on the stationary shaft 40 is a magnet wheel 45, whose rim 46 comprises a strong permanent magnet. This rim 46 is in proximity to but does not touch the inside of the inverted metallic cup 37. As the wheel 45 and magnet 46 are rotated on the shaft 40, there is exerted on the inverted cup 37 a magnetic or inductive torque which is proportional to the speed of rotation of the magnet 46. This proportionality of the torque on the cup to the rotative speed of the magnet is not a novel principle, having been extensively employed in the Warner type speedometer used on automobiles. It was because the permanent reliability of that type apparatus had been thoroughly established in common practice that it was considered suitable for development with artillery, where the usage may be equally severe. The rotation of the cup 37 under the torque described is restrained by the spiral spring 48, one end of which is attached to the upper part of the shaft 38, the other end being attached to the lug 49, which is secured to the horizontal extension of the frame 43. This spiral spring 48, like the cup 37 and frame 43, is shown in section in Fig. 3. Under the action of the torque induced by the rotating magnet 46, and the restraint of the spring 48, the cup 37 with its attached cup 34 will come to rest at some position indicating the speed of rotation of the magnet in the automobile speedometer for example, (of course in the ordinary case the scale was calibrated in miles per hour, corresponding to the rotative speed of the wheel geared to the speedometer). The use of such an ordinary speedometer has been disclosed above in this specification, as being geared to the gun controls and calibrated in terms of angular units per second, to indicate the angular velocity of the target. We are here desirous of indicating not only the angular velocity of the target, but that quantity multiplied by the time of flight of the projectile. For that purpose the following mechanism is employed.

The rotating magnet 46, instead of being inserted a fixed distance within the cup 37, is arranged so that it may be elevated and lowered within that cup. A pair of collars 50 and 51 are secured to the hollow shaft 52 of the magnet wheel 45. Between these collars 50, 51 is fitted the yoke or ring 53, which is connected by the link 54 to the arm 55. The collars 50, 51 are adjustable for wear in the usual manner so as to prevent undue lost motion. The arm 55 is pivoted at 56 to a portion of the main frame or casing 41, and is provided at its other end with a toothed sector 57, which engages with a worm 58, connected by any suitable gearing 59 with the mechanism of a fuze setter, (not shown in Fig. 3,—see Fig. 4), which fuze setter mechanism operates of course in accord with the time of flight of the projectile. The rotating magnet 46 is thus elevated or lowered within the cup 37 in proportion to the time of flight of the projectile as determined by the fuze setter.

The hollow shaft 52 is driven, thru a feather key connection 60, by the gear 61, in whose hollow hub 62 are arranged keyways in which the feather key 60 may slide. The elevating and lowering of the magnet 46 thus does not interfere with its being rotated by the gear 61. The gear 61 is mounted on the lower part of the fixed shaft 40, described above. The gear 61 is connected by any suitable gearing 63 with the controls by which the line of sight of the gun is elevated and lowered, (see Fig. 4). The rate of rotation of the magnet 46 can thus be made substantially proportional to the angular velocity of the target in a vertical direction. Strictly speaking, the angular velocity of the gun is not precisely the same as that of the line of sight, owing to the variation of the sight elevation. But as the rate of that variation is slow in comparison with that of the rate of movement of the gun, this error can generally be ignored,—though of course if desired the gearing 63 can be connected to the sight mechanism instead of the gun mechanism. The error referred to does not enter into the lateral movements of the gun, from which the horizontal lead is determined.

The torque on the cup 37 is not only proportional to the rate of rotation of the magnet 46, but also to the amount by which the magnet is inserted in the cup. In strictly calibrating the apparatus for various degrees of insertion, the angularity of the link 54 and other variable factors may be taken into account to obtain the calibration desired. In general the mechanism is arranged so that with a constant speed of rotation in the magnet 46, a certain increase in the time of flight as indicated by the fuse setting will produce sufficient insertion of the magnet 46 to give a proportionate increase in the indication on the wire 30, thru the response of the rotatable cup 34 as described. When the calibration curve plotted between insertion and torque, with constant speed of rotation, does not come out a strictly straight line, as may occur with some designs, it may be rectified if desired by introducing an appropriate variable travel in the insertion mechanism, as by a linkage as mentioned, or an equivalent cam. The calibration can also be varied by slotting the cup, changing its conformation, and other methods of correction as will be evident to those skilled in the art.

In the mechanism above described the reading is indicated by a reflected beam of light. It will be evident that other methods of indicating the reading may be employed, as a pointer, for example, or by marks on the circumference of the upper or lower cup, as is done in the ordinary automobile speedometer, which if not placed directly in the field of vision, can be reflected thereto.

There has been described a means whereby a bright spot is made to travel up and down the wire 30 in accord with the value of the vertical angular lead required at the gun. By a similar mechanism, arranged at right angles to the first mentioned mechanism and differing only in that the gearing connected to the gear 61 is driven from the horizontal controls of the gun instead of from the vertical, a bright spot is made to travel on the horizontal narrow strip or wire 65 in accord with the value of the horizontal angular lead required at the gun. The man at the primary sight 5 then operates his controls 7 and 8, as described in connection with Figs. 1 and 2, moving the cross-hairs 11' so as to keep them opposite the bright spots on the indicator wires 30 and 65, and accordingly maintaining an angular lead between the secondary sight 6 and the primary sight 5 corresponding to the values computed by the mechanism. The operator is of course free to use his judgment in giving the gun a different lead from that indicated, as would be desirable for example when the target suddenly changed its direction of flight. Owing to the prompt automatic response of the apparatus however, its indications can generally be followed.

There has been described the general principles of the sighting system by which the lead is separated out from the travel of the target so that it may be readily controlled; also the details of the cross-hair controlling mechanism and the automatic means by which the proper lead is indicated to the man at the primary sight 5. There can now be taken up in detail the complete lead controlling mechanism, one form of which is illustrated in Fig. 4, in which the mechanism is shown somewhat diagrammatically in order that its operation may be clearly disclosed. It will be understood that the arrangement of the parts may vary in different designs in order that the mechanism may be compactly built into various types of guns, as will be evident to the designer familiar with the essential principles of the invention as herein disclosed and claimed.

Referring now to Fig. 4, there will first be described the mechanism by which the angularity between the primary and secondary sights is altered, as outlined in connection with Fig. 1; there will then be taken up the connections by which the movable cross-hairs at the primary sight are correspondingly shifted, as was described in connection with Fig. 2; and then there will be described the mechanism by which the proper lead is automatically computed and indicated, as taken up in connection with Fig. 3; after which the operation of the entire apparatus will be understood and can be briefly summarized.

In Fig. 4 the primary sight 5 is shown connected with two secondary sights 6 and 6'. The two secondary sights 6 and 6' are the equivalent of the single secondary sight 6 shown in Fig. 1, the two being arranged as is customary in naval ordnance so that the vertical angular movements of the gun are controlled thru one of the sights as 6, and the horizontal angular movements of the gun are controlled thru the other sight 6'. Two gun pointers can thus be employed, the one at the sight 6 having the single duty of keeping a horizontal cross-hair on the target, which he does by operating the control wheel 3. This wheel 3 swings the gun 1 vertically thru the action of the worm and quadrant 70 connected to the gun trunnion 71, (shown dotted). This vertical angular movement of the gun 1, operating thru the automatic sight and fuze setter 72,—whose sight controlling arm 73 is shown connected to the primary sight 5 by the link 74,—elevates or lowers the line of sight of the primary sight 5, which motion is transmitted to the secondary sight 6 thru the gearing which will be described. By the operation of the control wheel 3 the horizontal crosshair of the secondary sight 6 is thus maintained on the target. The gun pointer at the other secondary sight 6' has the single duty of keeping his vertical cross-hair on the target, which he does by operating the control wheel 4, which thru the gearing 75 rotates the entire gun and mount, to which the sight 6' is attached, thru a sufficient horizontal angle to keep the vertical cross-hair on the target. The gearing 75 drives the pinion 75', which meshes with an internal gear in the fixed base 76, by which the gun mount can be rotated thru any desired horizontal angle. By thus subdividing and simplifying the gun pointer's duties, they can be performed with greater ease and accuracy than when a single secondary sight is used.

The primary sight 5 is connected to the secondary sight 6 thru a train of gearing which in general moves the sights 5 and 6 in unison, but which permits if desired any required vertical angular difference to be introduced between them. For example, the gear 77 is attached to the primary sight 5, so as to rotate with the motion of that sight, and meshes with the gear teeth on the circumference of a planetary casing 78. This casing 78 is also provided with internal teeth which mesh with the planetary gears carried on the spider 79, which transmit the motion to the central gear 80 of the planetary system. The spider 79, holding the planetary gears, is normally stationary, but can when desired be rotated thru a considerable angle by means of the handle 8. The motion from the central gear 80 is transmitted thru the gear 81 to the gear 82, to which the secondary sight 6 is connected. The gearing is proportioned so that, when the spider 79 is held stationary, the angular motion given to the secondary sight 6 is precisely equal to that of the primary sight 5. But if the planetary spider 79 is moved, a new angular relation is introduced between the central gear 80 and the casing 78 of the planetary system, according to the well known principles of planetary gearing, and this new angular relation produces a corresponding difference between the primary line of sight from 5 and the secondary line of sight from 6. As soon as the motion of the handle 8 stops the gear train goes on transmitting the motion from the primary to the secondary sight at the old one-to-one ratio, but maintaining the set angular difference between the two lines of sight. Any desired lead in a vertical direction can be thus introduced between the primary sight 5 and secondary sight 6 by simply operating the handle 8.

The primary sight 5 is also connected to the other secondary sight 6' thru a train of gearing which in this case has the function of transmitting the vertical angular motion of the sight 5 to the sight 6' without change, while simultaneously permitting any desired horizontal angular difference to be introduced between them. To transmit the vertical angular motion without change, the gear 83, to which the secondary sight 6' is attached, is connected to the primary gear 77 thru the intermediate gear 84. Since the secondary sight 6' is fixed in relation to the gear 83, and the gear ratio is unity, the neck of the sight 6' will be maintained parallel to that of the sight 5; and the lines of sight of the primary sight 5 and secondary sight 6', will in an elevation view such as Fig. 4, appear to be always parallel, (though in fact it is only the vertical angles in the plane of fire that are maintained equal, since the head of the sight 6' can be rotated at right angles to the plane of motion of the primary sight).

In order that an angular difference may be introduced between the primary sight 5 and secondary sight 6' in a plane at right angles to the plane of motion of the sights 5 and 6, that is, at right angles to the plane of fire, a gearing is provided which rotates the head 85 of the sight 6' in a transverse or lateral plane,—in other words, in a plane at right angles with the axis of the neck of the sight 6',—without interfering with the parallelism of the primary line of sight from 5 and the secondary line of sight from 6' as projected on the plane of fire, (that is, the plane of the paper in Fig. 4). By this means a lead is introduced at the sight 6' which is at right angles to the lead introduced at the sight 6. One means for creating this transverse motion in the line of sight from the secondary sight 6' is shown in Fig. 4, in which the gear 86, like the gear 77, is attached to the primary sight 5 so as to rotate with the motion of that sight. This gear 86 meshes with the gear teeth on the circumference of the planetary casing 87. The casing 87 is also provided with internal teeth which mesh with the planetary gears carried by the spider 88, which transmit the motion to the central gear 89 of the planetary system. The spider 88, like the spider 79, normally holds the planetary gears of the system from rotating orbitally around the central gear 89, though of course not preventing the rotation of the planetary gears on their own axes. But the spider 88 can when desired be rotated by the handle 7 attached thereto, and thus introduce an angular variation in the planetary system as was described in connection with the planetary system 78, 79, 80. The central gear 89 also meshes with a gear 91, which transmits the motion to a gear 92, which latter gear 92 is not fixed to the secondary sight 6'. This gear 92, though concentric with the gear 83, is free to rotate relative to that gear, and so relative to the neck of the sight 6'. A spur gear 93 is mounted on a stud attached to the gear 83 and meshes with the gear 92. The spur gear 93 also drives a worm which meshes with a worm wheel 95 attached to the rotatable head of the secondary sight 6'. The normal gear ratio between the gear 86 and the gear 92 is unity, as was the ratio between the gear 77 and the gear 83. There is therefore normally no relative motion between the stud carrying the gear 93 and the gear 92. Consequently the swing of the primary sight 5, which rotates the gears 83 and 92 in unison, will cause no rotation of the spur gear 93. But if the handle 7 is moved so as to introduce an angular variation in the gear train 86—92 as described, the gear 92 will be moved relative to the gear 83, which will shift the position of the gear 92 relative to the stud carrying the spur gear 93, and rotate the worm and spur gear 93 on their stud as an axis. The worm wheel 95 carrying the head of the sight 6' will thus be rotated, and a transverse angular lead thus introduced in the secondary sight 6'. The introduction of this transverse lead it will be noted has not interfered in any way with the motion of the sight 6' which is given it by the gear 83 in accord with the motion of the primary sight 5.

In the foregoing there has been described how the vertical and transverse lead may be given the secondary sights 6 and 6' by the operation of the control handles 8 and 7 respectively. It will be understood that the mechanism shown is merely illustrative, and that various equivalent mechanisms may be used as will be evident to those skilled in the art. For example, simple friction clutches may be substituted for the planetary gearing to introduce the angular variation desired.

If it is desired to use but a single secondary sight in place of a pair of secondary sights, the gear 86 is fixed to the gear 82 so as to rotate with it, and the secondary train of gears to sight 6' is then driven from the gears 82 and 86 so placed. In other words, the secondary sight 6' is driven from the sight 6, instead of from the sight 5. The secondary sight 6 can then be omitted, as the sight 6' will then have both the motions of the sight 6 and sight 6' as have been described, and the sight 6' will thus indicate both the vertical and transverse lead. It will be controlled by the handles 8 and 7 in the same manner as when a pair of secondary sights is employed.

The mechanical equivalent of thus driving the sight 6' from the gear 82 is shown in Fig. 5, and differs from the connection just described only in the omission of superfluous gears. In Fig. 5 the gear 86 is keyed to the same shaft as the gear 81, so that they rotate together. The gear 82 takes the place of the gear 83, and the sight 6" is given the combined motion of sight 6 and sight 6' of Fig. 4. The principles of operation are the same as in Fig. 4.

In order that the movable cross-hairs 11' at the primary sight 5 may correctly indicate the angular lead which has been given the secondary sights by the operation of the control handles 7 and 8, the control handles are connected with the cross-hair moving mechanism by a suitable gearing so proportioned that when a lead of a certain number of degrees is given the vertical or transverse secondary sights 6, 6', the horizontal and vertical cross-hairs are moved a corresponding amount in the field of vision of the primary sight 5. For example, if the field of vision of the primary sight 5 is thirty degrees, then one thirtieth of the distance across would correspond to one degree. In Fig. 4 the shaft 16, by which the movable cross-hairs are elevated and lowered, is connected by a gear train 96 to the spider 79, to which is attached a gear meshing with the gearing 96. The handle 8, when moving the spider 79, thus also operates the shaft 16 and elevates and lowers the horizontal movable cross-hair of the sight 5 correspondingly. The shaft 22, by which the movable cross-hairs of the sight 5 are moved transversely, is connected thru a suitable gearing 97 with a gear arranged on the spider 88 which is rotated by the handle 7 in giving the transverse lead. The vertical cross-hair of the primary sight 5 is thus moved to correspond to the transverse lead at the secondary sight 6'. In Fig. 4 the central fixed cross-hairs shown in Fig. 2 are omitted, a small dot in the center of the field of vision taking their place.

Taking up now the connections by which the amount of lead is automatically computed and indicated, the control wheel 3 is connected thru a train of gearing 100 with the gear 61 which drives the shaft 52 and rotates the magnet of the automatic indicator 41 as described in connection with Fig. 3.

One form of the automatic sight and fuse setter 72, which operates the worm 58 and also the fuse setter 101, is shown more in detail in Fig. 6, in which the altitude indicator 115 is shown connected to a pair of slightly spaced brushes 120 and 121, which are connected to the batteries B and B' respectively. The other terminals of the batteries are grounded. The brushes 120 and 121 play over copper segments 122, and each segment 122 has connected to it a copper strip 123, the various segments and copper strips being insulated from each other. The gun trunnion 71 has keyed thereto an arm 124, to which is pivoted a link 125, which connects to a guide block 126. The guide 126 is pivoted around the shaft 127, and thru the guide passes a rack bar 128, which operates the pinion 129, also mounted on the shaft 127. On the end of the rack bar 128 is arranged a contact point 130, which makes electrical contact with the exposed edges of the copper strips 123. A lead 132 connects the contact point 130 with the electric motor 133, after which the current passes thru the lead 134 to ground. The pinion 135 of the electric motor 133 rotates the gear 136, which, thru the pinion 129, moves the rack bar 128 in or out according as the motor 133 is supplied with positive or negative current. The gear 136 also rotates the gear 59 on the shaft 102, by which the worm 58 is operated, (see Fig. 3). Attached to the gear 136 is a worm shaft 137, which can be operated by the handwheel 118, and which turns a gear 138 relative to the gear 136, so that a pointer 117, (attached to the gear 138), may be set relative to a pointer 116, (attached to the gear 136). These pointers play over the load lead scale and indicate the fuse setting, as will be described. The gear 138 operates the fuse setter 101 thru the medium of the gearing 139, 140. The fuse setter 101 is of the standard U. S. bracket type, such as described for example in the Manual of 3-inch artillery materiel, published by the Government Printing Office, Washington, D. C. The shell 141 whose fuse is to be set is inserted in the fuse setter 101 in the usual manner. The operation of this portion of the mechanism is as follows: one of the brushes, say 120, is supplied with positive electricity from the battery B, and the other brush 121 is supplied with negative electricity from the battery B'. The indicator 115 having been set at the altitude designated by the central fire control officer, all the segments 122 and strips 123 which are connected to the brush 120 are given a positive potential, and all those connected to the brush 121 are given a negative potential. The particular segment 122 with its strip 123 which happens to fall under the gap between the brushes 120 and 121, that is, directly under the indicator 115, is given neither positive nor negative potential. The strips 123 are thus divided into two zones of positive and negative potential, with a neutral strip in between. The motion of the trunnion 71, communicated thru the link 125 to the guide 126, swings the rack bar 128 over the strips 123, and as the contact 130 meets strips 123 below the neutral strip the contact is given positive potential which operates the motor 133 to elevate the rack bar so as to bring the contact 130 up to the neutral strip; or if the contact passes above the neutral strip, the motor receives negative potential so as to rotate in the opposite direction and bring the contact 130 down to the neutral strip. Thus as the rack bar 128 is swung to various angular positions corresponding to the angle of the gun, the contact 130 is made to follow the particular strip 123 whose segment 122 lies in the gap between the brushes 120 and 121. The motion given the gear 136 and the fuse setter 101 depends on the curvature of the strips 123, and the curvature of each strip is designed so as to give the desired motion or settings corresponding to its particular altitude. A sufficient number of the strips 123 are provided to give substantially correct settings for all altitudes. The motion given the shaft 102 by the gear 59 is proportional to the time of flight corresponding to the designated altitude and the existing angular position of the gun. But as the angular position of the gun is constantly changing, a time fuse, if set according to this determination, would generally be incorrect by the time the shell could be loaded into the gun and fired, an operation which might take say two seconds. To correct for this, the gear 138, driving the fuse setter 101, can be set slightly ahead of the gear 136,—that is, the pointer 117 is set slightly ahead of the pointer 116,—so that the reading on the load lead scale which comes under the pointer 117 at the instant the shell is withdrawn from the fuse setter will come under the pointer 116 at the instant of discharge of the gun. The man operating the control wheel 118 watches the readings on the load lead scale as they pass slowly under the pointer 117, so as to catch the reading when the shell is withdrawn from the fuse setter 101. If the pointer 116 has not reached this reading when he hears the discharge of the gun, the operator knows that he has given too much lead, or if it has passed the reading, he knows that he has given too little lead. The correction is thus checked at each shot, and with a little practice it can be made very accurately without much difficulty, as the motion of the pointers is not rapid, and the time interval with a well drilled gun crew is fairly steady.

In Fig. 4 the worm 58 is shown operating two sectors 57, one for the horizontal automatic indicator 41' and one for the vertical automatic indicator 41. The mechanism of the two indicators is similar, as has been stated. The horizontal automatic indicator 41' indicates the proper transverse lead, and its main shaft 52' is connected with the control handle 4 by the train of gearing 110, so that the magnet of the indicator 41' is rotated at a rate proportional to the speed with which the gun 1 is rotated on its base 76,—that is, proportional to the motion in azimuth of the target.

Having covered in detail the operation of all its parts, the general operation of the complete sight lead controlling system can now be understood. When an enemy aircraft is to be engaged, the central fire control officer in charge of all the guns orders the altitude setting at which he desires the fire. The pointer controlled by the handwheel 115 is promptly set at the designated reading on the altitude scale of the automatic sight and fuze setter 72 and the gun is trained on the target thru the operation of the controls 3 and 4, the gun pointer at the control 4 looking thru the sight 6' and keeping his vertical cross-hair on the target, while the gun pointer at the control 3 looks thru the sight 6 and keeps his horizontal cross-hair on the target. The operation of the control 3 elevates or lowers the gun, which motion, transmitted to the automatic sight setter 72 causes the proper angle of sight elevation to be continuously set,—that is, the angle between the line of sight of the primary sight 5 and the line of projection of the gun is maintained continuously correct by the sight setter 72 and transmitted to the sight 5 by the link 74; and this motion of the primary sight 5 is transmitted to the secondary sights 6 and 6' thru the connecting gear trains. The vertical angular motion of the gun 1 also causes the automatic fuze setter to operate, setting the fuze setter 101 as has been described, and rotating the gear 59 and shaft 102, which thru the intermediate gearing operates the worm 58 and sectors 57, thus transmitting the time of flight to the lead computing apparatus 41, 41'.

The angular velocity of the target is simultaneously transmitted to the lead computing apparatus 41, 41' from the controls 3 and 4, thru the connecting gearing 100 and 110; and the automatic apparatus, operating as described in connection with Fig. 3, then gives an indication at the sight 5 of the proper value of the lead to be given the sights 6 and 6'. The movable cross-hairs of the sight 5 are then set according to this indication, and by properly operating the controls 7 and 8 are maintained at the correct indication, which varies from time to time. The operators at the secondary sights 6 and 6' keep their horizontal and vertical cross-hairs on the target by operating the controls 3 and 4, and thus give the gun the proper lead to compensate for the movement of the target during the flight of the projectile. Since the displacement of the movable cross-hairs of the sight 5 is the same as the displacement of the secondary sights, the fact that the secondary sights are kept trained on the target makes the target float at the intersection of the movable cross-hairs of sight 5, apparently automatically, so far as the operator at sight 5 is concerned. A dot in Fig. 4 represents the target, and rests at the intersection of the movable cross-hairs in the primary sight 5; in the secondary sight 6 it will be noted that the dot is squarely on the horizontal line, by the operation of the control 3, but is displaced from the vertical owing to the transverse lead over which that sight has no control; while at the secondary sight 6' the target lies on the vertical cross-hair, by the operation of the control 4, but is displaced above the horizontal cross-hair because of the vertical lead, over which that sight has no control. In the primary sight 5 the center of the sight represents the actual point of aim, and the movable cross-hairs are displaced above and to the left, corresponding to the actual lead, and the target rests on the movable cross-hairs. The distance from the intersection of the movable cross-hairs to the center of the primary sight 5 is the distance the target will generally travel during the time of flight of the projectile.

It will be obvious that the vertical cross-hair of the secondary sight 6 and the horizontal cross-hair of the secondary sight 6' may be omitted without interfering with the operation of the apparatus when double secondary sights are used. When only one secondary sight is used, as in Fig. 1, it will of course have both cross-hairs arranged in the usual manner,—fixed and intersecting at the center of the sight,—and this center will be maintained directly on the target by the operation of the controls 3 and 4.

In the foregoing there has been described a sight lead controlling system embodying the general principles of my invention. It will be obvious to those skilled in the art that the apparatus is susceptible to many variations and adaptations in various installations without departing from the scope of the invention as outlined in the following claims.

I claim:

1. In artillery, the combination of a gun, a primary sight which continuously indicates the point of aim of the gun when firing at a moving target, a secondary sight which is maintained on the target, and means for varying the angular relation between the line of sight of the primary sight and the line of sight of the secondary sight.

2. In artillery, the combination of a gun, a primary sight which continuously indicates the point of aim of the gun when firing at a moving target, a secondary sight which is trained on the target, means for varying the angular relation between the line of sight of the primary sight and the line of sight of the secondary sight, and means for indicating at the primary sight the point of aim of the secondary sight.

3. In artillery, the combination of a gun, a primary sight which indicates the point of aim of the gun, a secondary sight which is trained on the target, means for varying the angular relation between the line of sight of the primary sight and the line of sight of the secondary sight, means for indicating at the primary sight the point of aim of the secondary sight, and means for indicating at the primary sight the relation desired between the line of sight of the primary sight and the line of sight of the secondary sight.

4. In artillery, the combination of a gun, a primary sight which continuously indicates the point of aim of the gun when firing at a moving target, a secondary sight which is trained on the target, and means for indicating at the primary sight the point of aim of the secondary sight.

5. In artillery, the combination of a gun, a sight which indicates the actual point of aim of the gun when firing at a moving target, a secondary sight which is directed at the target, and means for indicating in the field of vision of the first mentioned sight the amount of angular lead required in the pointing of the gun to compensate for the movement of the target.

6. In artillery, the combination of a gun, a control mechanism for pointing the gun, a fuze setter, a primary sight which indicates the point of aim of the gun, a secondary sight which is trained on the target thru the operation of the control mechanism, means for varying the angular relation between the line of sight of the primary sight and the line of sight of the secondary sight, means for indicating at the primary sight the point of aim of the secondary sight, automatic means for indicating at the primary sight the relation desired between the line of sight of the primary sight and the line of sight of the secondary sight, said automatic means being actuated by the fuze setter and by the control mechanism.

7. In artillery, the combination of a gun, a sight, means for throwing the line of sight out of line with the actual line of aim of the gun to compensate for the movement of a target, and automatic means actuated by the movements of the gun in following the moving target for making visible to the eye the actual point in space indicating the amount the line of sight should be thrown out of line with the actual line of aim.

8. In a fire control mechanism, the combination of a primary sight which continuously indicates the point of aim when firing at a moving target, a secondary sight which is maintained on the target, and means for varying the angular relation between the line of sight of the primary sight and the line of sight of the secondardy sight.

9. In a fire control mechanism, the combination of a primary sight which continuously indicates the point of aim when firing at a moving target, a secondary sight which is trained on the target, means for varying the angular relation between the line of sight of the primary sight and the line of sight of the secondary sight, and means for indicating at the primary sight the point of aim of the secondary sight.

10. In a fire control mechanism, the combination of a primary sight which indicates the point of aim, a secondary sight which is trained on the target, means for varying the angular relation between the line of sight of the primary sight and the line of sight of the secondary sight, means for indicating at the primary sight the point of aim of the secondary sight, and means for indicating at the primary sight the relation desired between the line of sight of the primary sight and the line of sight of the secondary sight.

11. In a fire control mechanism, the combination of a primary sight which continuously indicates the point of aim when firing at a moving target, a secondary sight which is trained on the target, and means for indicating at the primary sight the point of aim of the secondary sight.

12. In a fire control mechanism, the combination of a sight which indicates the actual point of aim when firing at a moving target, a secondary sight which is directed at the target, of the gun, and means for indicating in the field of vision of the first mentioned sight the amount of angular lead required in the pointing of the gun to compensate for the movement of the target.

13. In a fire control mechanism, the combination of a primary sight which indicates the point of aim, said primary sight having an extended field of vision, a secondary sight which is trained on the target, said secondary sight having a more limited field of vision but a higher power of magnification than the primary sight, means for varying the angular relation between the line of sight of the primary sight and the line of sight of the secondary sight, and means for indicating at the primary sight the point of aim of the secondary sight.

14. In a fire control mechanism, the combination of an element which is moved according to the vertical angle of fire, a control mechanism for pointing said element, an automatic mechanism for determining the time of flight of the projectile, a primary sight which indicates the point of aim of the said element, a secondary sight which is trained on the target thru the operation of the control mechanism, means for varying the angular relation between the line of sight of the primary sight and the line of sight of the secondary sight, means for indicating at the primary sight the point of aim of the secondary sight, automatic means for indicating at the primary sight the relation desired between the line of sight of the primary sight and the line of sight of the secondary sight, said automatic means being actuated by the automatic time determining mechanism and by the control mechanism for pointing.

15. In a fire control mechanism, the combination of an element which is moved according to the vertical angle of fire, a control mechanism for pointing said element, an automatic mechanism for determining the time of flight of the projectile, a primary sight which indicates the point of aim of said element, a secondary sight which is trained on the target thru the operation of the control mechanism, the magnifying power of the secondary sight being greater than that of the primary sight, means for varying the angular relation between the line of sight of the primary sight and the line of sight of the secondary sight, means for indicating at the primary sight the point of aim of the secondary sight, automatic means for indicating at the primary sight the relation desired between the line of sight of the primary sight and the line of sight of the secondary sight, said automatic means being actuated by the automatic time determining mechanism and by the control mechanism for pointing.

In witness whereof I have hereunto set my hand this 17th day of September, 1918.

ROBERT V. MORSE.

Witnesses:
MARGARET SUMMER FUERTES,
LOUIS A. FUERTES.